(No Model.)

G. A. SPROSS.
BUCKET.

No. 292,703. Patented Jan. 29, 1884.

WITNESSES
Phil C. Dieterich
W. F. O'Berne

INVENTOR
Geo. A. Spross
By F. O. McCleary,
Attorney

UNITED STATES PATENT OFFICE.

GEORGE A. SPROSS, OF TOLEDO, OHIO.

BUCKET.

SPECIFICATION forming part of Letters Patent No. 292,703, dated January 29, 1884.

Application filed November 17, 1883. (No model.)

*To all whom it may concern:*

Be it known that I, GEORGE A. SPROSS, of Toledo, in the county of Lucas and State of Ohio, have invented certain new and useful Improvements in Buckets; and I do hereby declare the following to be a full, clear, and exact description of the invention, such as will enable others skilled in the art to which it pertains to make and use the same.

My invention relates to buckets or packages adapted, primarily, for the transportation of butter, lard, and similar products.

The object of the invention is to combine with an ordinary wooden bucket or pail an inner vessel of sheet metal, as hereinafter fully described, said vessel being provided with a removable wooden bottom.

The invention consists in the features of construction and combinations of parts hereinafter set forth, and pointed out in the claim.

Figure 1:
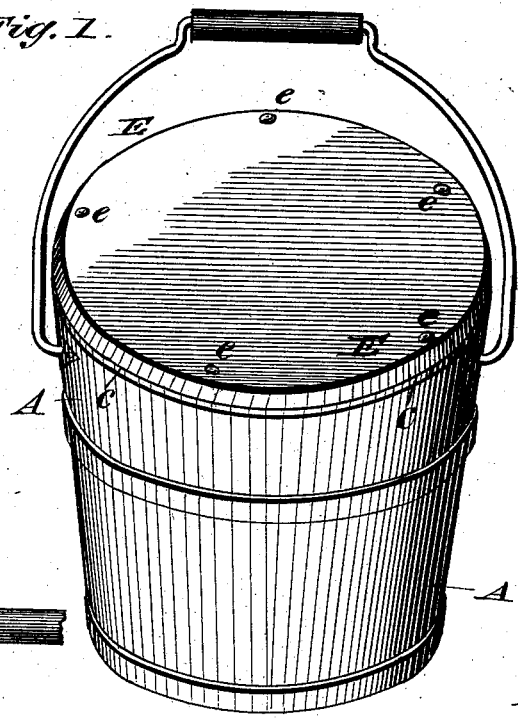
Figure 2:
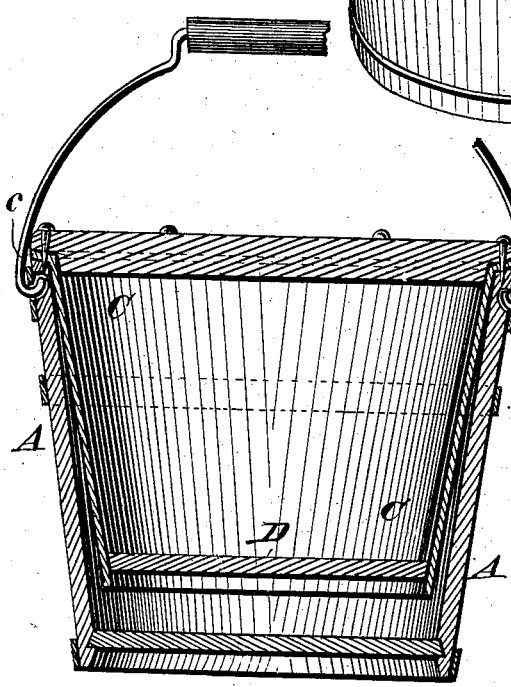
Figure 3:
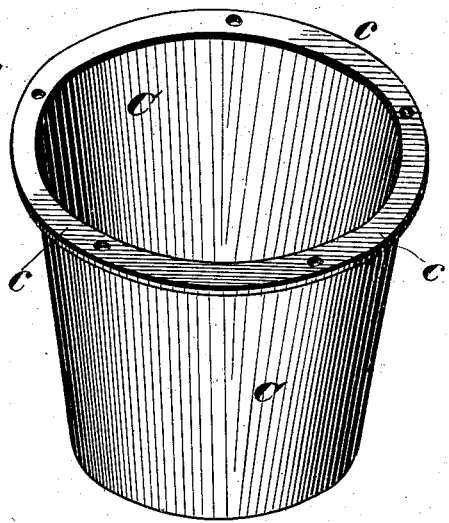

In the drawings, Figure 1 represents a perspective view of my improvement. Fig. 2 is a vertical section of the same, and Fig. 3 represents the inner vessel removed.

A represents an ordinary wooden bucket provided with the usual bail.

C represents an inner vessel, preferably of tin, formed with an annular top flange, c, adapted to rest upon the upper edge of the bucket A. This vessel C is formed to snugly fit within the bucket A, and is provided with a wooden bottom, D, whose periphery is beveled, to adapt it to fit tightly within the vessel C.

E represents the cover of the bucket A, adapted to be secured to the latter by tacks or nails e, which pass through said cover and the flange c of the vessel C and into the top edge of the bucket A.

From the construction thus described it will be apparent that the contents of the inner vessel, C, will be fully protected and securely packed. To remove the contents of the package, the cover E is removed and the inner vessel, C, is lifted out, and the contents of the latter may be easily removed by pushing up the bottom D from the under side of the vessel C. If the vessel C is not desired for further use, the bucket A may be used for any purpose desired independently of said vessel.

An important advantage of the device thus described is found in the fact that the vessel C may be readily constructed at a trifling expense, as the removable wooden bottom D avoids the labor and expense of forming said vessel with an integral tin bottom. The top flange, c, of the vessel C is securely held between the top edge of the bucket A and the cover E, thus preventing all rattling or movement of the vessel within the bucket.

Having fully described my invention, what I desire to claim and secure by Letters Patent is—

The combination, with a wooden bucket, of a sheet-metal vessel adapted to snugly fit within said bucket, and provided with a removable wooden bottom and an annular top flange resting upon the top edge of the bucket and secured by the cover of the latter, substantially as set forth.

In testimony whereof I have signed this specification in the presence of two subscribing witnesses.

GEO. A. SPROSS.

Witnesses:
ELLA L. HAMILTON,
THOS. H. TRACY.